United States Patent [19]

Weimert et al.

[11] Patent Number: 4,858,222

[45] Date of Patent: Aug. 15, 1989

[54] CIRCUIT ARRANGEMENT FOR SERIAL DATA TRANSMISSION

[75] Inventors: Guenter Weimert; Ferdinand Narjes, both of Munich, Fed. Rep. of Germany

[73] Assignee: Siemens Aktiengesellschaft, Berlin and Munich, Fed. Rep. of Germany

[21] Appl. No.: 78,977

[22] Filed: Jul. 29, 1987

[30] Foreign Application Priority Data

Jul. 29, 1986 [DE] Fed. Rep. of Germany ....... 3625613

[51] Int. Cl.⁴ .............................................. H04J 3/02
[52] U.S. Cl. ........................................ 370/13; 370/85; 340/825.5
[58] Field of Search ............................ 370/13, 85, 88; 340/825.5, 825.51, 825.06

[56] References Cited

U.S. PATENT DOCUMENTS

| | | | |
|---|---|---|---|
| 4,617,565 | 10/1986 | Nakata et al. | 340/825.5 |
| 4,700,344 | 10/1987 | Kaino et al. | 370/13 |
| 4,801,934 | 1/1989 | Herkert | 340/825.02 |

FOREIGN PATENT DOCUMENTS

| | | |
|---|---|---|
| 0096097 | 12/1983 | European Pat. Off. . |
| 0150457 | 8/1985 | European Pat. Off. . |
| 3433150 | 3/1986 | Fed. Rep. of Germany . |
| 60-72350 | 4/1985 | Japan . |

Primary Examiner—Robert L. Griffin
Assistant Examiner—Wellington Chin
Attorney, Agent, or Firm—Hill, Van Santen, Steadman & Simpson

[57] ABSTRACT

A circuit arrangement, for serial data transmission via at least one bus, is made up of plural subscriber stations each having a time circuit, by means of which faulty seizure of the bus can be discontinued. In order to achieve the highest possible level of availability with a comparatively large number of subscriber stations, the bus is connected to a data transmission network via a coupling device which itself includes a time circuit for the discontinuation of faulty seizures of the data transmission network by the bus. The circuit arrangement can be used advantageously in monitoring devices of electrical information transmission technology in which a plurality of stations each containing a plurality of locating devices are connected to a control processor.

9 Claims, 3 Drawing Sheets

CIRCUIT ARRANGEMENT FOR SERIAL DATA TRANSMISSION

BACKGROUND OF THE INVENTION

The invention relates to a circuit arrangement for serial data transmission and more particularly to such an arrangement having a plurality of subscriber stations interconnected over a bus, which stations can communicate with a further station over a data transmission network.

A circuit arrangement of this kind has already been diclosed in the German OS No. 3433150. The known circuit arrangement contains a drive circuit with two opto-couplers connected in series with one another. A drive module for the opto-couplers comprises a control circuit which, on the occurrence of a static fault signal, via a timer or time circuit blocks the connection to the opto-couplers of a single station. This prevents the data transmission line from becoming blocked to all other subscribers in the event of a static fault signal at one station.

As, subscriber circuits are connected in parallel to the bus, a control circuit's liability to break down increases in proportion to the number of subscriber circuits connected to the bus. Therefore in circuit arrangements comprising a comparatively large number of subscriber circuit's it can occur that, when the availability of the circuit arrangement is subject to particuarly high usage requirements, these requirements cannot be fulfilled by the known measures.

Therefore the aim of the invention is to design a circuit arrangement of the type referred to in the introduction, in such manner that it exhibits the highest possible level of availability even in the case of a comparatively large number of subscriber stations. In particular, the facility is to be provided with means for locating out-of-order subscriber stations.

In accordance with the invention, a circuit arrangement for serial data transmission is designed with a coupling device interconnecting the bus of the subscriber stations with a data transmission network, such coupling device incorporating a time circuit having a longer time constant than the time circuits assigned to the individual subscriber stations.

These measures result in the advantage that the circuit arrangement for serial data transmission is effectively protected both in respect of static fault signals of subscriber circuits and also in respect of control circuit faults blocking the data transmission network.

German Published Application 3436441 discloses a data communications facility for serial data transmission that comprises a data network having a tree structure. The stations are arranged in a plurality of network levels. Signal collectors, that collect and forward signals, are situated at the network nodes. Since the signal collectors do not produce a connection between a plurality of bus systems, the data transmission network cannot be blocked by static error signals. However, microprocessors or the like are required in each of the network nodes.

In the circuit arrangement of the present invention, static error signals can be identified because the data to be transmitted are supplied to a timer circuit that responds only to given static signals, i.e. to signals that are active over a long time span, but does not respond to the transmission of signals having status changes that follow one another relatively fast.

In an improvement of the invention, in the event that the subscriber circuits transmit pulse sequences of a predetermined maximum duration, the control circuit is designed so as to respond to the overshooting of the predetermined, maximum duration. Here it can be expedient that the pulse sequence be converted into a continuous signal, in particular with the assistance of a retriggerable monoflop, and that the continuous signal be monitored by means of the control circuit. These measures are particularly advantageous if the bus comprises a control bus in addition to a data bus, so that the control circuit need only analyze the logic level at a control output of the subscriber circuit on the control bus, in order to monitor the predetermined, maximum duration of the pulse sequence.

Other measures achieve the advantage that once a static fault signal has occurred, it triggers a permanent, enforced disconnection. Then the subscriber circuit or group of subscriber circuits in question no longer responds. The absence of a response can serve as a criterion for the location of out-of-order subscriber stations. In the improbable event that a control circuit, assigned to a coupling device, is itself out-of-order, the group of subscriber circuits which includes the subscriber circuit whose control circuit is defective can be identified at the central station.

The desired enforced clearance of the bus and the data transmission network is expediently effected by logic means.

Display and alarm devices are provided, which serve to further simplify the fault locating. These measures are particularly advantageous if the groups of subscriber circuits which are connected to a common data bus are arranged at one and the same location, such as in a spatially adjacent array.

The measure for resetting, in the event of a temporary interruption, achieves the advantage that the self-holding of the time circuit is terminated by interrupting the power to the device which contains the self-holding time circuit, such as disconnecting it from a power supply receptacle. If the subscriber circuit and the control circuit, and the coupling device and the control circuit, are in each case accommodated in one and the same device which must anyhow be disconnected from its power source receptacle for the repairs required in the event of a fault, the desired termination of the self-holding takes place automatically in this way.

Logic means is provided for the self-holding of the time circuit.

Another aspect of the invention provides means which are simple to implement, in the event of an impermissibly long seizure of the bus, the subscriber circuit in question is unable to influence the data bus and the coupling device in question is unable to influence the data transmission network.

These and other objects and advantages will become clear from a review of the following description and the accompanying drawings.

SUMMARY OF THE DRAWINGS

The invention will be explained in detail in the form of the exemplary embodiments which are presented in the figures.

DESCRIPTION OF THE PREFERRED EMBODIMENT

Figure 1:
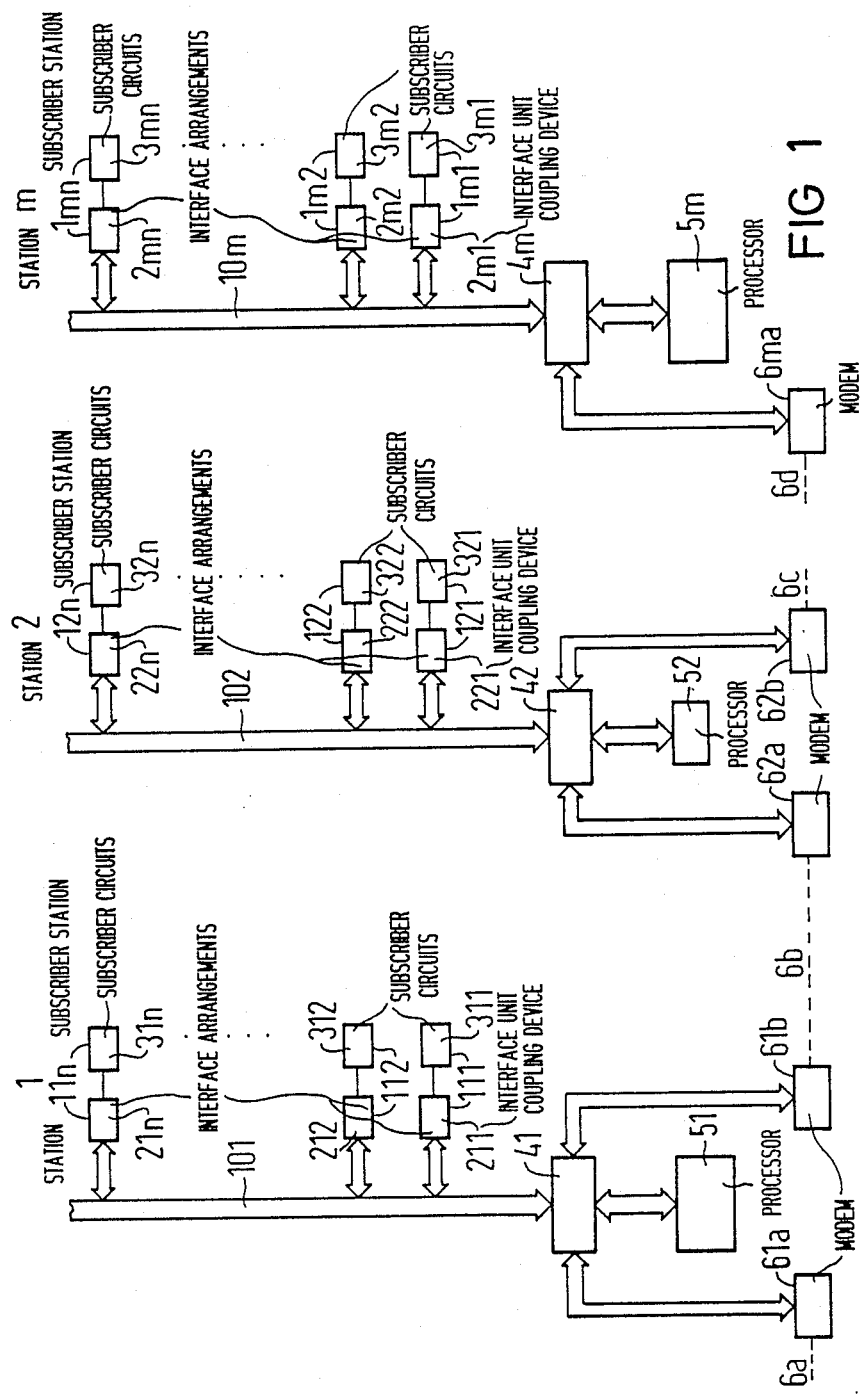
FIG. 1 is a diagram of a circuit arrangement for serial data transmission, wherein a plurality of bus systems are coupled to form a data transmission network, and with reference to the circuit arrangement represented in FIG. 1.

The circuit arrangement shown in FIG. 1 comprises the stations 1 to m which are arranged so as to be spatially separate from one another. By the connection of a processor 51 . . . 5m to a coupling device 41 . . . 4m the station 1 . . . m becomes the central station. All the stations 1 . . . m are provided with one or two data terminal devices or modems 61a . . . 6ma, which are interconnected via the connection line 6a . . . 6d to form a data transmission network. The stations 1 . . . m exchange information via the data transmission network.

The subscriber stations 111 . . . 1mn each contain a subscriber circuit 311 . . . 3mn and an interface arrangement 211 . . . 2mn.

The subscriber circuits 311 . . . 31n of station 1 are connected via the interface arrangements 211 . . . 21n to the data bus 101. The subscriber circuits 321 . . . 32n are arranged at station 2. These subscriber circuits are connected to the data bus 102 via the interface arrangements 221 . . . 22n. Of the other stations 2 . . . m, only the station m has been presented. This contains the subscriber circuits 3m1 . . . 3mn, which are connected to the data bus 10m via the interface arrangements 2mi . . . 2mn.

The subscriber circuits 311 . . . 3mn consist, in particular, of microprocessor-controlled devices which can transmit data when called-up by one of the processors 51 . . . 5m. In some cases only part of the stations 1 . . . m are provided with a processor 51 . . . 5m. The processors are controlled in such manner that they transmit only when the data transmission network is not seized (by another unit).

Station 1 contains the coupling device 41, by means of which the local bus 101, the processor 51 and the data terminal devices or modems 61a, 61b can be coupled to one another. Station 2 contains the coupling device 42 which serves to couple the local bus 102 to the data terminal devices or modems 62a, 62b. Station m contains the coupling device 4m by means of which the local bus 10m, the processor 5m and the data terminal device or modem 6ma are coupled.

The coupling device 41 . . . 4m consists of a transmitting/receiving module for each data bus and a distributor circuit connected to the control and data lines. The distributor circuit is a logic circuit which is designed in such manner that a seizure signal incoming on one of the control lines connects the data bus which is assigned to the respective control line to all the other data buses. This ensures that the information transmitted by one of the subscriber stations can be received by all the other subscriber stations.

Figure 2:
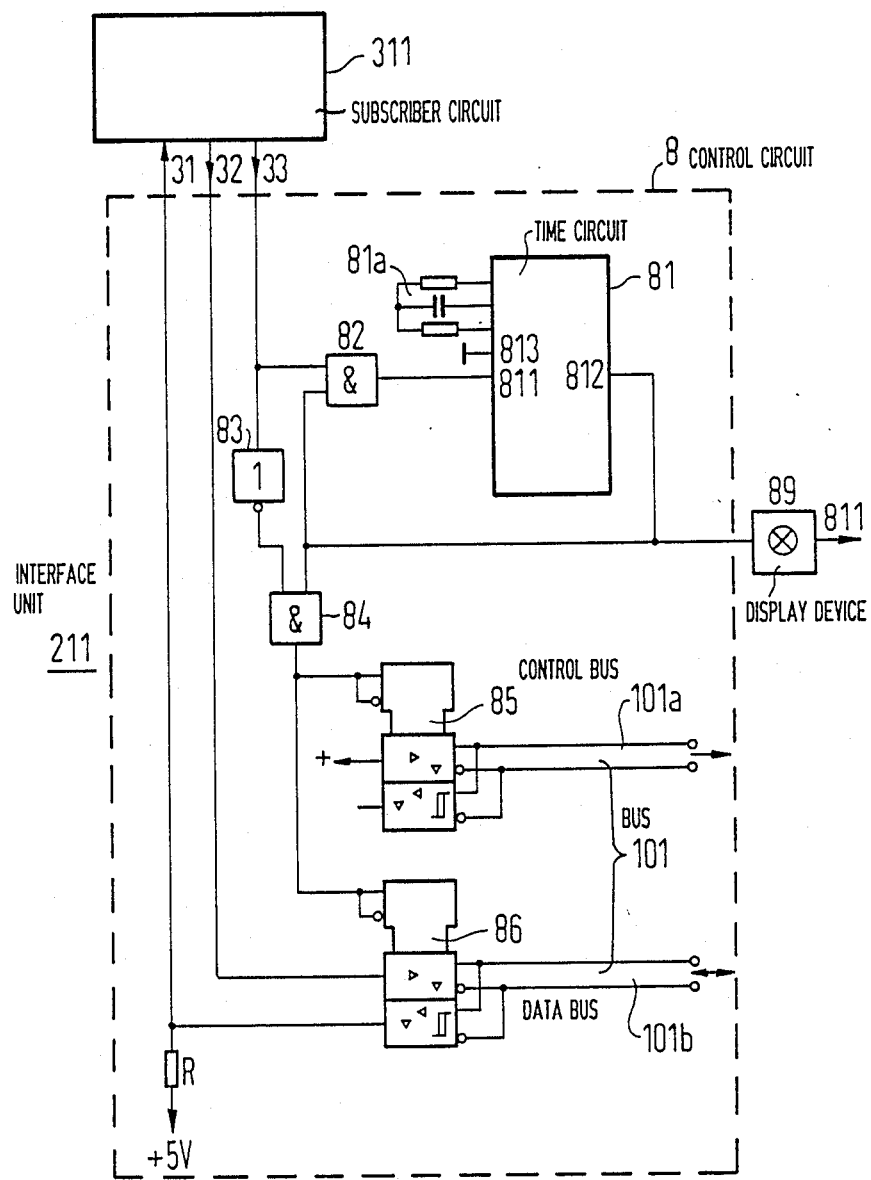
FIG. 2 is a diagram of an interface arrangement with a control circuit.

The circuit arrangement in FIG. 2 serves for serial data transmission and forms part of a bus system which is located at various locations, to which all the data sources and data transmitters are connected in parallel via a common bus line and via common bus 101 . . . 10m. The buses are designed to use the standard communications procedures according to RS485.

In the rest state the outputs of all the interface circuits 211 . . . 2mn are switched tri-state, or high impedance.

The bus systems 101 . . . 10m, located at various locations and assigned to various stations 1 . . . m, are interconnected to form a data network via the coupling devices 41 . . . 4m and digital data terminal devices 61a . . . 6ma or, in the case of a delayed commencement of the data transmission, via modems.

For the orderly transmission of the data between the various subscriber circuits 311 . . . 3mn it is preferable to use a so-called call-up procedure, in which at any one time a processor calls up only one subscriber circuit, which then transmits its data. Following the transmission of the data, the output of the interface arrangement of the called-up subscriber circuit is switched high-impedance again.

Another possibility of carrying out ordered transmissions consists, for example, in that the subscriber circuits are synchronized to carry out a time-staggered emission of messages, for example by means of counters which are arranged in the subscriber circuits and which are set to produce control signals at different staggered times.

If a subscriber circuit is continuously transmitting as a result of a defect therein, it is disabled at the end of a predetermined waiting time so that the seizure of the bus is released and further seizure of the bus 101 . . . 10m is prevented.

In each interface arrangement 211 . . . 2mn on the occasion of each call-up, the duration of the data transmission of the associated subscriber circuit is monitored. If the duration of the data transmission which follows a call-up exceeds a predetermined waiting time $t_1$, the connection of the subscriber circuit to the respective bus system is interrupted even through such transmission is still in progress. The connection can be interrupted, for example, by means of electronic switches which are located between the outputs of the interface arrangement and the bus line, and which are closed when signals are transmitted. A circuit arrangement of this kind for connecting a subscriber circuit to a bus line is known described in the publication No. E-A2-0 150 457.

If interface arrangements 211 . . . 2mn contain interface modules which can be selectively activated or brought into a high-impedance state by control signals, these are expediently additionally driven by the assigned control circuit 8. A circuit arrangement of this kind can be seen in FIG. 2.

To simplify the locating of a faulty subscriber circuit 311 . . . 3mn, a display lamp on the assembly can be switched on and an alarm can be given.

FIG. 2 is a diagram of an interface arrangement with a control circuit for bus line for communications according to RS 485.

The subscriber circuit 311 (FIG. 2) has a data input 31, a data output 32 and control output 33. The control output 33 leads directly to an input of an AND-gate 82 and leads via an inverter 83 to an input of an AND-gate 84. A timer or time circuit 81 has an input 811, which is connected to the output of the AND-gate 82, and an output 812 is connected to an input of the AND-gate 82, to an input of the AND-circuit 84 and to the input of the display device 89. The time circuit 81 is, for example, a time module of integrated circuit type CD 4541 and contains a clock generator whose clock frequency is determined by an external circuit 81a.

The output of the AND-gate 84 leads to the control inputs of the interface modules 85 and 86 which are of integrated circuit type SN 75176. The output of the interface module 85 leads to the control bus 101a, while the output of the interface module 86 leads to the data bus 101b of the bus 101. The interface module 86 is connected both to the data input 31 and to the data output 32 of the subscriber circuit 311. The data input 31 is connected to the supply voltage +5V via a high resistance resistor R.

If the subscriber circuit 311 is called up by the processor 51, the data from the bus 101b is fed via the interface module 86 to the data input 31 of the subscriber circuit 311.

When the time circuit 81 is in its reset state, the high logic level H prevails at the output 812 of the time circuit, so that the AND-gates 82 and 84 are open to a seizure signal arriving from the control output 33. If the subscriber circuit 311 transmits data to the processor, the control output 33 is activated and changes from the logic level H to a low logic level L. The logic level H occurs at the output of the inverter 83 and is transferred via the AND-gate 84 to the control inputs of the interface modules 85 and 86. As a result, the data output 32 of the subscriber circuit 311 is connected to the data bus 101b and the control bus 101a is activated. The time circuit 81 is simultaneously started via the AND-gate 82.

If the transmitting time of the subscriber circuit 311 exceeds the predetermined waiting time, the logic level at the output 812 of the time circuit 81 changes from H to L and blocks or inhibits the AND-gates 82 and 84.

As a result of the blockage of the AND-gate 82, the time circuit 81 cannot be started via the control output 33 of the subscriber circuit 311, and the output 812 remains in the L state. In this state the AND-gate 84 switches the inputs of the interface modules 85 and 86 to high-impedance, independently of the level at the control output 33, so that the control bus 101a and the data bus 101b are separated from the input 31 and form the output 32 of the subscriber circuit 311, and the bus lines 101 are not burdened by signals from the interface modules 85 and 86. The response of the control circuit 8 is indicated via the display means 89, and an alarm is output via the terminal 891.

When the interface arrangement 211 is disconnected from its power source and then reconnected, then the timer circuit 81 is reset via the automatic reset terminal 813 which is connected to ground potential. The output 812 thereby assumes the H logic level, so that the original condition is restored.

Figure 3:
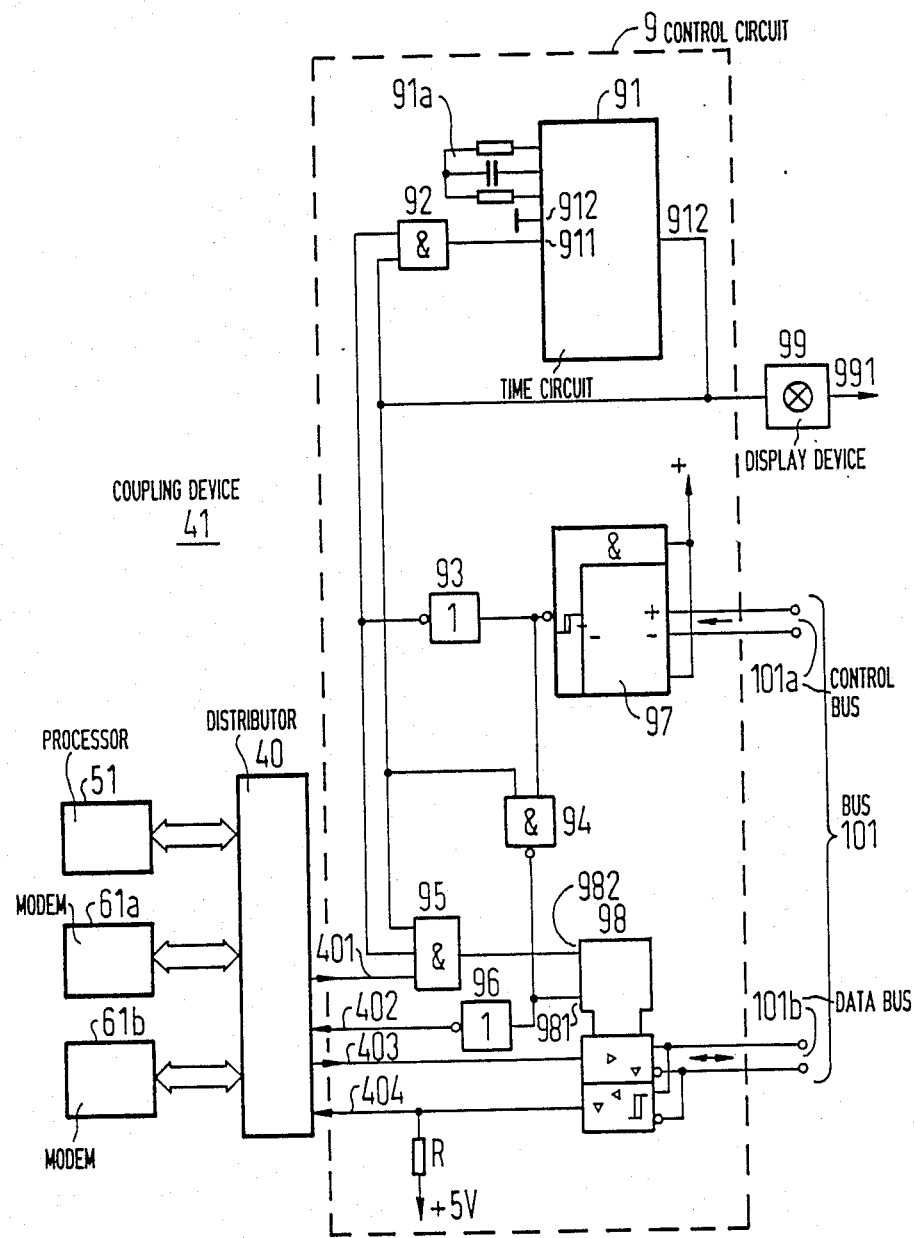
FIG. 3 is a diagram of a coupling device with a control circuit.

FIG. 3 shows a switching apparatus comprising a control circuit. A time circuit 91 of the switching apparatus 41 is similar to that shown in FIG. 2, and differs only in its time constant.

In the circuit arrangement in FIG. 1, the coupling devices 41 . . . 4m each contain a control circuit by means of which a control line assigned to the data bus 101 . . . 10m is monitored. In some case the data line itself can be monitored, in particularly in bus systems in which no separate control line is provided. If a plurality of data buses are connected to a coupling device, it is expedient to provide a separate control circuit for each data bus.

If the control bus is seized by an interface arrangement 211 . . . 2mn for longer than a set time of $t_2$, the data bus is cut off from the coupling device of the stations 1, 2 and m, and thus from the remainder of the data transmission network.

The coupling devices 41 . . . 4m are of identical construction. FIG. 3 represents the construction of an example of the coupling device 41. The control circuit 9 is arranged between the bus 101 and the distributor circuit 40.

The bus 101 comprises a control bus 101a and a data bus 101b. The control bus 101a leads to the level converter 97, which for example is integrated circuit type DS 88LS120. The output of the level converter 97 leads directly to an input of a NAND-gate 94 and leads via the inverter 93 to an input of AND-gates 92 and 95.

The distributor 40 connects the control circuit 9 with the processor 51 and the other modules 61a and 61b, etc, by control lines 401 and 402 and data lines 403 and 404.

The output 912 of the time circuit 91 is connected to an input of the AND-gates 92 and 95, the NAND-gate 94 and the display device 99.

The time module 91 is, for example, a timer of integrated circuit type CD 4541 and contains a clock generator whose clock frequency is determined by an external circuit 91a. The output of the NAND-gate 94 leads directly to a control input of an interface module 98 and leads via the inverter 96 to the control input 402 of the distributor circuit 40. The interface module 98 is, for example, integrated circuit type SN 75176. The output of the interface module 98 leads to the data bus 101b.

If the transmitting time of a subscriber circuit 311 . . . 31n connected to the bus 101 exceeds the waiting time of the control circuit 9, due to the failure of the assigned control circuit 8, the logic level at the output of the time circuit 91 changes from H to L and blocks or inhibits the AND-gates 92 and 95 and the NAND-gate 94.

The result of the blockage of the AND-gate 92 is that the time circuit 91 cannot be started via the control bus 101a and units 97 and 93, and the output 912 remains in the L state. In this state the NAND-gate 94 switches to the logic level H irrespectively of the level of the control bus 101a, so that the control lines 401 and 402 of the distributor circuit 40 are not seized by the bus 101. At the same time both outputs of the interface module 98 are switched to a high-impedance, and thus the data bus 101b is cut-off from the data lines 403 and 404 of the distributor circuit 40.

The control circuit 9 and the distributor circuit 40 make up the coupling device 41. If the power to the coupling device 41 is disconnected and then reconnected, the time circuit 91 is reset since the automatic-reset terminal 913 carries ground potential. The output 912 now assumes the logic level H so that the original state is reestablished.

Before one of the subscriber circuits 311 . . . 31n connected to the bus 101 transmits its data to its coupling device 41 via the data bus 101b, it first activates the control bus 101a, whereby H logic level arises at the output of the level converter 97. As a result, the NAND-gate 94 connects a logic L level to the control input of the interface module 98 and the receiver on the interface module 98 is switched on. In this status, the data bus 101b is connected through the distributor 40 to the processor 51 and to the communication adapters or, respectively, modems 61a, 61b via the data line 404.

At the same time, L logic level proceeds via the inverter 93 and via the AND-gate 92 to the reset input 911 of the time circuit 91, so that the timer circuit 91 is started.

When the sending time of a subscriber circuit 311 . . . 31n exceeds the time constant of the timer circuit 91, then the output 912 of the timer circuit 91 assumes the L level. This logic level inhibits the AND-gate 92, so that the timer circuit cannot be restarted. The logic level H is simultaneously fed via the NAND-gate 94 to the control input of the interface module 98. Thus, the receiver in the interface module 98 is blocked, and the control input 402 of the distributor circuit 40 is cut-off from the control bus 101a. In addition, the triple-AND-gate 95 cuts off the control output 401 of the distributor circuit 40, providing logic level L to the control line leading to the control input of the interface module 98, and thus switches the output of the transmitter of the interface module 98 to high-impedance, so that no data collission can occur on the data bus 101b.

The response or state of the control circuit 9 is displayed via the display device 99 and an alarm is given via the terminal 991.

Setting the waiting times $t_2$ and $t_1$ to be such that $t_2$ is greater than $t_1$ ensures that the control circuits 9 of the coupling devices 41 ... 4m do not respond when the control circuit 8 of the interface arrangements 211 ... 2mn are operating normally.

The circuit arrangement for serial data transmission shown in FIGS. 1 to 3 is particularly suitable for extended data transmission networks which can be used to transmit data from a plurality of stations to a processor serving as a central control and analysis device. In a preferred application each station contains a number of line terminals having information transmitting devices which are provided with so-called locating devices. The locating devices each contain a microprocessor which analyzes fault messages of an in-system monitoring device and supplies the results of such on request to a central processor.

The time staggered enforced disconnection of defective locating devices or interface arrangements containing a defective control circuit ensures that the central processor can acquire the operating state messages, fault messages, alarms etc., even when a fault likely to lead to a blockage of the data transmission network has occurred in one of the locating devices and/or a control circuit assigned to the locating device.

It will be apparent that various additions and modifications may be made in the apparatus of the present invention without departing from the essential features of novelty thereof, which are intended to be defined and secured by the appended claims.

We claim:

1. In a circuit arrangement for serial data transmission among at least one remote subscriber station and a plurality of first subscriber stations (111 ... 1mn) interconnected by at least one bus (101 ... 10m), each of said subscriber stations comprising a subscriber circuit (311 ... 3mn) and an interface unit (211 ... 2mn) for seizing said bus and coupling the subscriber circuit (311 ... 3mn) to the bus (101 ... 10m), the combination comprising;

an interface control circuit (8) for at least one of said interface units including a first time circuit (81) for establishing a first time interval for seizing said bus by one of said first subscriber stations;

means connected to said time circuit and operative in the event of a fault within said one first subscriber station during seizure of the bus (101 ... 10m) by its interface unit, for discontinuing said seizure at the end of said first time interval;

a coupling device (41 ... 41m) for the selective coupling of said bus to a data transmission network for allowing serial data transmission between said one first subscriber station and said one remote subscriber station;

said coupling device having a coupling control circuit (9) incorporating a second time circuit (91) for establishing a second predetermined time interval for seizure of said bus, and means for producing a disconnect signal in order to discontinue the connection between said data transmission network (61 ... 6d) and said bus (101 ... 10m) when said bus seizure exceeds said second predetermined time interval, said second predetermined time interval being greater than said first predetermined time interval; and central control and analysis device means connected with said data transmission network, whereby data is transmitted from a plurality of stations over said network to said central control and analysis device.

2. Apparatus as claimed in claim 1, wherein said interface control circuit responds to the exceeding of said first time interval, which corresponds to the maximum duration of subscriber transmission over said bus.

3. Apparatus as claimed in claim 1, wherein the time circuits (81, 91) of said interface control circuits (8) assigned to the subscriber stations (111 ... 1mn) and the coupling control circuit (9) assigned to the coupling device (41 ... 4m) are each provided with means for assuming a timing state during the pendency of its respective time interval.

4. Apparatus as claimed in claim 1, wherein each of said first and second time circuits has a reset input, and including an AND-gate (82, 92), connected to the reset input (811, 911) of each time circuit (81, 91), said AND-gate having one input connected to a control line and a further input connected to the output (812, 912) of its respective time circuit (81, 91).

5. Apparatus as claimed in any one of the claims 2 to 4 and 1 wherein said first and second time circuit (81, 91) includes means for resetting it in the event of a temporary interruption in the supply voltage.

6. Apparatus as claimed in claim 4 wherein the output of the control circuit (8) leads to an AND-gate (84) which is connected to the bus, said bus (101) comprising a data bus (101b) and a control bus (101a), and means for connecting said subscriber circuit (311) via an interface module (85, 86) to the control bus (101a) and the data bus (101b), and means for connecting the control inputs of the interface modules (85, 86) to the AND-gate (84) (FIG. 20).

7. Apparatus as claimed in any one of the claims 2 to 4 and 1 including a distributor (40) and a level converter (97), said bus (101) connected to a coupling device (41), is connected to a control input (402) of said distributor circuit (40) via said level converter (97), and including a logic-linking circuit (94) which is in the form of an AND-gate and which is connected to the level converter (97) and to the output of the control circuit (9), and a triple-AND-gate (95) having its inputs connected to the output of the control circuit (9), the output of the level converter (97) and a control output (401) of the distributor circuit (40), and having its output connected to a control input of an interface module (98), said interface module being connected by its transmitter and its receiver between the data bus (101b) and the distributor circuit (40).

8. Apparatus as claimed in any one of the claims 2 to 4 and 1 wherein said interface control circuits (8) which are assigned to the subscriber stations (111 ... 1mn) and the coupling control circuits (9) which are assigned to the coupling devices (41 ... 4m) are each provided with a display-and/or alarm device (89, 99) which is connected to the control circuit (8, 9) and which displays the state of the control circuit (8, 9).

9. Apparatus as claimed in any one of the claims 2 to 4 and 1 wherein said first and second time circuit (81, 91) is formed by a counter which is connected to a clock generator, and an AND-gate connected to the output of said counter and to the reset input (811, 911) of said counter.

* * * * *